(12) United States Patent
Zhou et al.

(10) Patent No.: US 11,975,641 B2
(45) Date of Patent: May 7, 2024

(54) SEWING STRUCTURE FOR IMPROVING APPEARANCE OF SEAT COVER

(71) Applicant: Yanfeng International Automotive Technology Co., Ltd., Shanghai (CN)

(72) Inventors: Qibin Zhou, Shanghai (CN); Yaoyuan Ding, Shanghai (CN); Lifeng Hu, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 17/789,837

(22) PCT Filed: Mar. 5, 2020

(86) PCT No.: PCT/CN2020/078062
§ 371 (c)(1),
(2) Date: Jun. 29, 2022

(87) PCT Pub. No.: WO2021/142898
PCT Pub. Date: Jul. 22, 2021

(65) Prior Publication Data
US 2023/0055534 A1 Feb. 23, 2023

(30) Foreign Application Priority Data
Jan. 19, 2020 (CN) .......................... 202020121019.2

(51) Int. Cl.
*D05B 35/02* (2006.01)
*A47C 7/02* (2006.01)
*A47C 31/02* (2006.01)
*B60N 2/58* (2006.01)
*B60N 2/60* (2006.01)

(52) U.S. Cl.
CPC ......... *B60N 2/5883* (2013.01); *B60N 2/5891* (2013.01)

(58) Field of Classification Search
CPC ...... B60N 2/5891; B60N 2/5883; B60N 2/70; B60N 2/58; B62J 1/18; B60R 13/02
See application file for complete search history.

(56) References Cited

U.S. PATENT DOCUMENTS

| | | | | |
|---|---|---|---|---|
| 1,999,424 A * | 4/1935 | Seitz | ........................ | A45C 3/00 190/126 |
| 2,290,007 A * | 7/1942 | Valentine | ............. | D05B 15/005 112/419 |
| 3,671,984 A * | 6/1972 | Ambrose | ................ | B32B 5/245 5/409 |
| 3,940,812 A * | 3/1976 | DiForti | ..................... | A43B 9/00 D6/606 |
| 4,650,251 A * | 3/1987 | Shimada | ................. | B29C 65/08 297/DIG. 2 |
| 4,724,327 A * | 2/1988 | Mitchell | ................... | F21K 2/00 250/462.1 |

(Continued)

*Primary Examiner* — Shin H Kim
(74) *Attorney, Agent, or Firm* — Merchant & Gould P.C.

(57) ABSTRACT

The present invention relates to a sewing structure for a seat cover, comprising a first cut piece (1), a second cut piece (2), a first sewing thread (3), a second sewing thread (4) and an inlay (5), wherein the first and the second cut piece in an overlapped status are sewn together by the first and the second sewing thread which are spaced apart from each other, wherein the inlay is arranged between the first and the second cut piece and between the first and the second sewing thread.

11 Claims, 2 Drawing Sheets

(56) References Cited

U.S. PATENT DOCUMENTS

| | | | | |
|---|---|---|---|---|
| 6,588,838 | B1* | 7/2003 | Dick, Jr. | B60N 2/5825 |
| | | | | 280/730.2 |
| 6,877,177 | B1* | 4/2005 | Marcangelo | A47C 27/003 |
| | | | | 5/411 |
| 7,278,363 | B2* | 10/2007 | Wieczorek | B68G 7/105 |
| | | | | 112/470.27 |
| 7,469,968 | B2* | 12/2008 | Hazlewood | B60N 2/58 |
| | | | | 297/452.59 |
| 7,690,318 | B2* | 4/2010 | Dooley | B29C 45/14 |
| | | | | 112/475.17 |
| 7,823,980 | B2* | 11/2010 | Niwa | B60N 2/58 |
| | | | | 297/452.61 |
| 9,517,709 | B2* | 12/2016 | Kitajima | B60N 2/646 |
| 9,817,169 | B2* | 11/2017 | Wenzel | G02B 6/001 |
| 10,112,514 | B2* | 10/2018 | Lemarchand | B60N 2/5891 |
| 10,471,867 | B2* | 11/2019 | Ohtsu | B60N 2/5883 |
| 10,654,383 | B2* | 5/2020 | Ishii | B60N 2/5816 |
| 10,960,797 | B2* | 3/2021 | Hennig | A47C 31/02 |
| 11,192,478 | B2* | 12/2021 | Hering | B60N 2/5891 |
| 2007/0014969 | A1* | 1/2007 | Olley | B29C 44/351 |
| | | | | 428/102 |
| 2007/0022931 | A1* | 2/2007 | Wieczorek | B68G 7/105 |
| | | | | 112/475.06 |
| 2015/0283941 | A1* | 10/2015 | Wenzel | B60Q 3/54 |
| | | | | 362/511 |
| 2017/0113588 | A1* | 4/2017 | Ochiai | B60N 2/646 |
| 2017/0305317 | A1* | 10/2017 | Sekino | B60N 2/58 |
| 2021/0023971 | A1* | 1/2021 | Hering | B68G 7/105 |
| 2021/0031658 | A1* | 2/2021 | Hering | B60N 2/5891 |
| 2022/0153189 | A1* | 5/2022 | Nascimento | B60Q 3/54 |

* cited by examiner

SEWING STRUCTURE FOR IMPROVING APPEARANCE OF SEAT COVER

CROSS-REFERENCE TO RELATED APPLICATIONS

This application is a National Stage Application of PCT/CN2020/078062, filed 5 Mar. 2020, which claims priority benefit to Application No. 202020121019.2 filed with the Chinese Patent Office on 19 Jan. 2020, and entitled "Sewing Structure for Improving Appearance of Seat Cover", all the contents of which are incorporated herein by reference in their entirety.

TECHNICAL FIELD

The present invention relates to an automobile seat, in particular to a sewing structure for improving the appearance of a seat cover.

BACKGROUND OF INVENTION

With the intensified competition in the automobile industry, requirements for the appearance of a stich for a seat cover become higher. In the prior art, both CKD (Completely Knocked Down) samples and local samples produced according to producing processes for CKD samples have the problematic appearance of a wavy and non-smooth stitch L' as shown in FIG. 4.

SUMMARY OF INVENTION

An object of the present invention is to provide a sewing structure for improving the appearance of a seat cover, in order to solve the problem that a sewing thread of a seat cover has a wavy and non-smooth stich in the prior art.

The sewing structure for improving the appearance of a seat cover of the present invention comprises a first cut piece, a second cut piece, a first sewing thread, a second sewing thread and an inlay, wherein the first and the second cut piece in an overlapped status are sewn together by the first and the second sewing thread which are spaced apart from each other, wherein the inlay is arranged between the first and the second cut piece and between the first and the second sewing thread.

Preferably, the inlay has a cross section of a solid circle, a hollow circle, a solid ellipse, a hollow ellipse, a solid rectangle, a hollow rectangle, a solid triangle, or a hollow triangle.

Preferably, the inlay is a cotton strip, a polypropylene strip, a nylon strip, a polyethylene strip, or a metal wire.

Preferably, the first and the second cut piece are respectively a leather skin, a polyurethane skin, a polyvinyl chloride skin, or a fabric skin.

Preferably, the first and the second cut piece each have a thickness between 1 mm and 10 mm.

Preferably, the first sewing thread has a distance between 3 mm and 10 mm to a free end of the sewing structure.

Preferably, the first sewing thread has a spacing between 2 mm and 6 mm between its two adjacent needle holes.

Preferably, the second sewing thread has a spacing between 2 mm and 6 mm between its two adjacent needle holes.

In the sewing structure for improving the appearance of a seat cover according to the present invention, the problem of a wavy and non-smooth stitch wave can be fundamentally eliminated, and the appearance level of a seat can be improved greatly.

EMBODIMENTS

Preferable embodiments of the present invention are provided and described in detail with references to the accompanying drawings.

Figure 1:
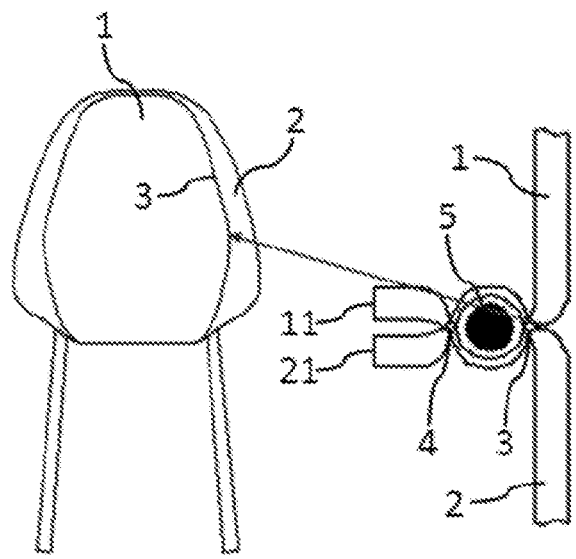
FIG. 1 is a schematic view of an overall structure of a sewing structure for improving the appearance of a seat cover according to a preferable embodiment of the present invention.

As shown in FIG. 1, a sewing structure for improving the appearance of a seat cover according to a preferable embodiment of the present invention comprises a first cut piece 1, a second cut piece 2, a first sewing thread 3 (also referred to as an inner sewing thread), a second sewing thread 4 (also referred to as an outer sewing thread) and an inlay 5, wherein the first cut piece 1 and the second cut piece 2 in an overlapped status are sewn together by the first sewing thread 3 and the second sewing thread 4 which are spaced from each other, wherein the inlay 5 is arranged between the first and the second cut piece 1, 2 and between the first and the second sewing thread 3, 4. In this embodiment, the inlay 5 is wrapped in a close chamber defined by the first cut piece 1, the second cut piece 2, the first sewing thread 3 and the second sewing thread 4, and can't move freely. It would be appreciated that the inlay 5 isn't completely immovable, since it isn't fixed to the cut pieces 1, 2. For example, it can be pulled out along its longitudinal direction. In this embodiment, the inlay 5 has a solid circular cross section. It would be appreciated that different cross sections may be selected for the inlay according to different fabrics and seat styles, such as a hollow circular cross section, a solid elliptical cross section, a hollow elliptical cross section, a solid rectangular cross section, a hollow rectangular cross section, a solid triangular cross section, or a hollow triangular cross section. In this embodiment, the inlay 5 is made of a cotton strip. It would be appreciated that different materials may be selected for the inlay according to different fabrics and seat styles, such as PP (polypropylene), nylon, PE (polyethylene), a metal wire, etc. In addition, different sizes may be selected for the inlay according to actual requirements. In this embodiment, the materials of the first cut piece 1 and the second cut piece 2 are leather respectively. It would be appreciated that other materials are also suitable for the cut pieces according to the present invention, such as PU (polyurethane), PVC (polyvinyl chloride), fabrics, etc. In this embodiment, the fabrics of the first cut piece 1 and the second cut piece 2 are respectively flat fabrics. It would be appreciated that rolled fabrics are also suitable for the present invention. In this embodiment, the first cut piece 1 and the second cut piece 2 each have a thickness between 1 mm and 10 mm. In this embodiment, a distance between the first sewing thread 3 and the free ends 11, 21 of the cut pieces 1, 2 is referred to as a seam distance, which is between 3 mm and 10 mm. In this embodiment, a distance between two adjacent needle holes of the first sewing thread 3 and the second sewing thread 4 is referred to as a needle spacing, which is between 2 mm and 6 mm.

Figure 2:
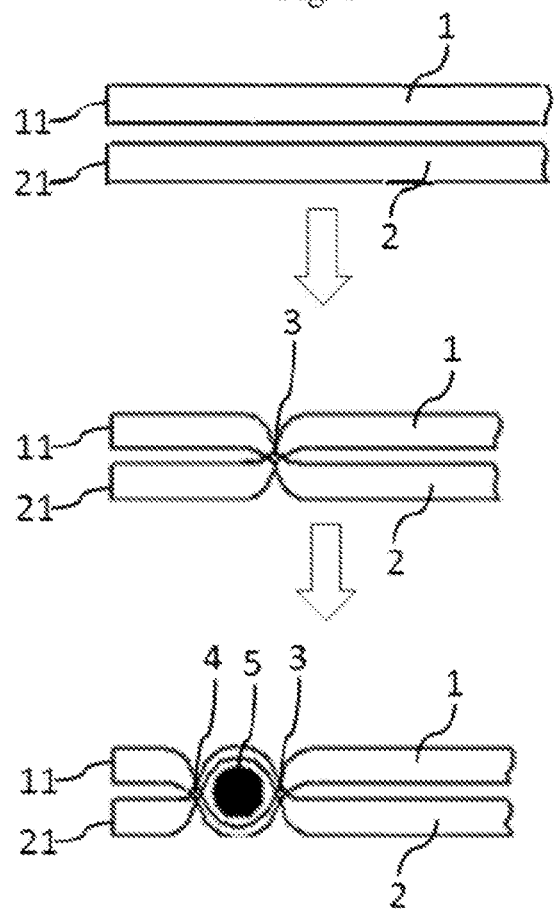
FIG. 2 shows a producing process for the sewing structure of FIG. 1.
Figure 3:
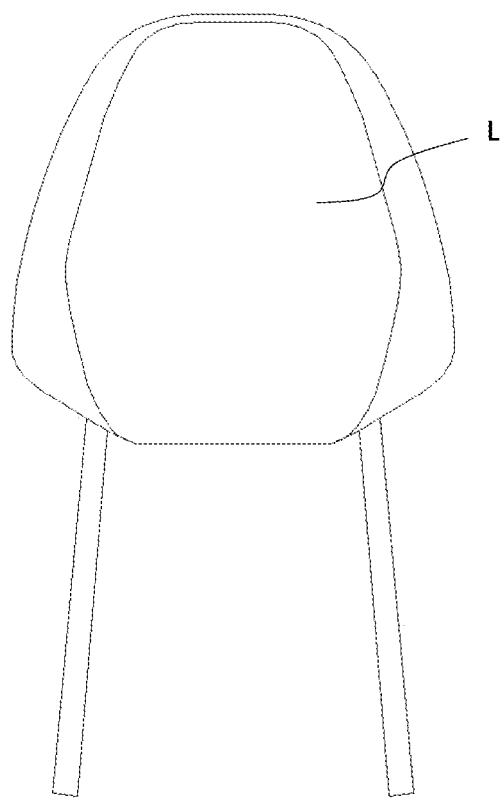
FIG. 3 is a view of an improved seat cover according to a preferable embodiment of the present invention, which shows a smooth stitch L of a sewing thread.
Figure 4:
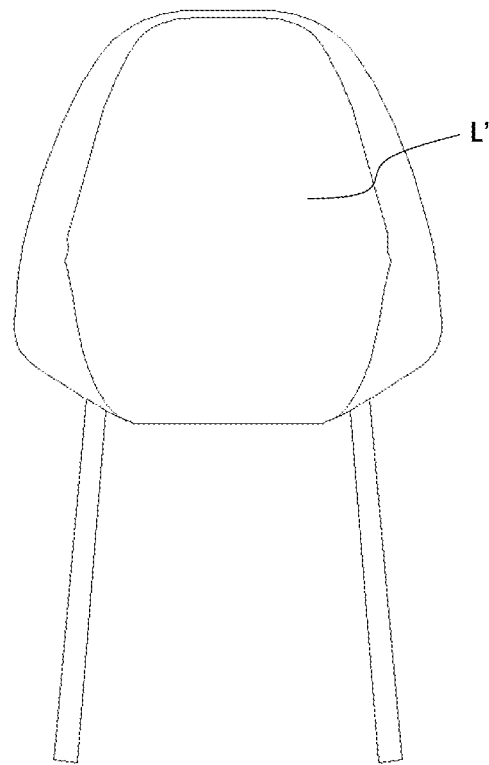
FIG. 4 is a view of a seat cover in the prior art, which shows a non-smooth stitch L' of a sewing thread.

Now, with reference to FIG. 2, a producing process for the sewing structure for improving the appearance of a seat cover in this embodiment is introduced. Specifically, at first, the first cut piece 1 and the second cut piece 2 are provided, wherein their free ends 11, 21 are aligned. Then, the first cut piece 1 and the second cut piece 2 are sewn together by the first sewing thread 3. Thereafter, the inlay 5 is placed outside the first sewing thread 3 and between the first cut piece 1 and the second cut piece 2. At the end, the first cut piece 1 and the second cut piece 2 are sewn together by the second sewing thread 4 outside the inlay 5. In the sewing structure produced in such a process, the smoothness of the front stitch L of the sewing threads (especially on a cambered surface) can be improved largely, as shown in FIG. 3, and thus the appearance level of the automobile seat can be improved greatly.

The above-mentioned embodiments are only preferable embodiments of the present invention, and aren't intended to limit the scope of the present invention. The above-mentioned embodiments of the present invention may be revised variously. Simple modifications and equivalents and changes, which are made on the basis of the disclosure in the claims and in the description of the present invention application, fall into the protection scope of the claims of the present invention. Conventional technical means may be not described in detail.

The invention claimed is:

1. A sewing structure for a seat cover, wherein the sewing structure comprises:
   a first cut piece and a second cut piece, the first cut piece forming a first exterior portion of the seat cover, and the second cut piece forming a second exterior portion of the seat cover different from the first exterior portion,
   a first sewing thread and a second sewing thread, which are spaced apart from each other, wherein the first and the second cut pieces each have a respective free edge portion, the free edge portions being sewn together by the first and the second sewing threads, and
   an inlay arranged between the first and the second cut pieces and between the first and the second sewing threads, wherein the inlay is wrapped in a close chamber defined by the first cut piece, the second cut piece, the first sewing thread and the second sewing thread, the free edge portions and the inlay being disposed in an interior portion of the seat cover.

2. The sewing structure according to claim 1, wherein the inlay has a solid circular cross section, a hollow circular cross section, a solid elliptical cross section, a hollow elliptical cross section, a solid rectangular cross section, a hollow rectangular cross section, a solid triangular cross section, or a hollow triangular section.

3. The sewing structure according to claim 1, wherein the inlay is a cotton strip, a polypropylene strip, a nylon strip, a polyethylene strip, or a metal wire.

4. The sewing structure according to claim 1, wherein the first and the second cut piece are a leather skin, a polyurethane skin, a polyvinyl chloride skin or a fabric skin, respectively.

5. The sewing structure according to claim 1, wherein the first and the second cut piece each have a thickness between 1 mm and 10 mm.

6. The sewing structure according to claim 1, wherein the first sewing thread has a distance between 3 mm and 10 mm to a free end of the sewing structure.

7. The sewing structure according to claim 1, wherein in that the first sewing thread has a spacing between 2 mm and 6 mm between its two adjacent needle holes.

8. The sewing structure according to claim 1, wherein the second sewing thread has a spacing between 2 mm and 6 mm between its two adjacent needle holes.

9. A seat cover for an automobile seat comprising the sewing structure as recited in claim 1.

10. A producing process for the sewing structure for a seat cover as recited in claim 1, comprising the steps of:
    providing the first cut piece, the second cut piece and the inlay,
    sewing the free edge portions of the first and the second cut pieces together by the first sewing thread,
    arranging the inlay between the first and the second cut pieces,
    sewing the free edge portions of the first and the second cut pieces together by the second sewing thread,
    wherein the inlay is arranged between the first and the second sewing threads, and wherein the first and the second sewing threads are spaced apart from each other, wherein the inlay is wrapped in a close chamber defined by the first cut piece, the second cut piece, the first sewing thread and the second sewing thread.

11. The producing process as recited in claim 10, wherein,
    at first, the first and the second cut piece are provided, wherein their free ends are aligned;
    then, the free edge portions of the first and the second cut piece are sewn together by the first sewing thread;
    thereafter, the inlay is placed outside the first sewing thread and between the first and the second cut piece; and
    at the end, the free edge portions of the first and the second cut piece are sewn together by the second sewing thread outside the inlay.

* * * * *